R. H. STANDISH.
APPARATUS FOR FEEDING SHELLS.
APPLICATION FILED APR. 20, 1910.

986,777.

Patented Mar. 14, 1911.
2 SHEETS—SHEET 1.

INVENTOR
R. H. Standish
BY
F. M. Wright,
ATTORNEY

WITNESSES:

R. H. STANDISH.
APPARATUS FOR FEEDING SHELLS.
APPLICATION FILED APR. 20, 1910.

986,777.

Patented Mar. 14, 1911.
2 SHEETS—SHEET 2.

WITNESSES:

INVENTOR
R. H. Standish
BY
Fred Wright,
ATTORNEY

UNITED STATES PATENT OFFICE.

RAYMOND H. STANDISH, OF MARTINEZ, CALIFORNIA.

APPARATUS FOR FEEDING SHELLS.

986,777.  Specification of Letters Patent.  Patented Mar. 14, 1911.

Application filed April 20, 1910.  Serial No. 556,568.

*To all whom it may concern:*

Be it known that I, RAYMOND H. STANDISH, a citizen of the United States, residing at Martinez, in the county of Contra Costa and State of California, have invented new and useful Improvements in Apparatus for Feeding Shells, of which the following is a specification.

This invention relates to an apparatus for feeding shells to a machine for filling the same, and the object of the invention is to provide an apparatus of this character which will be simple in construction and of great capacity for its size.

Figure 1:
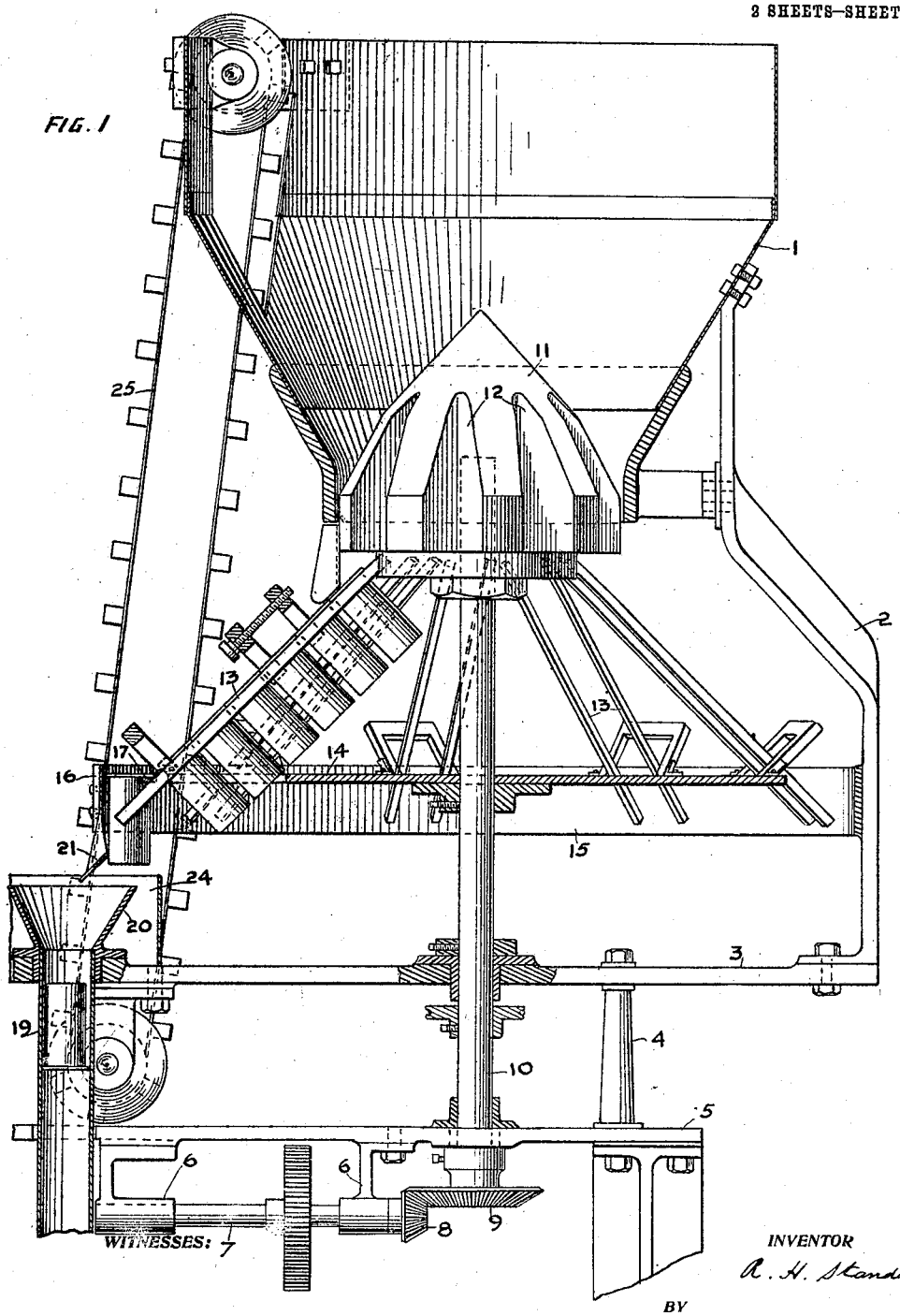
Figure 2:
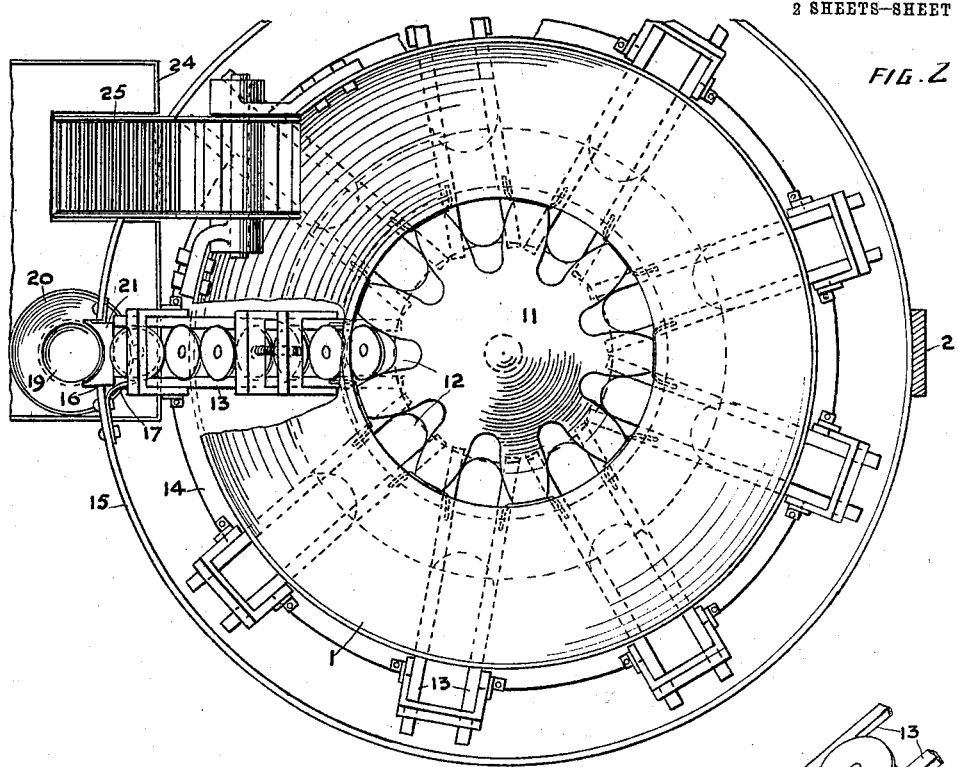
Figure 3:
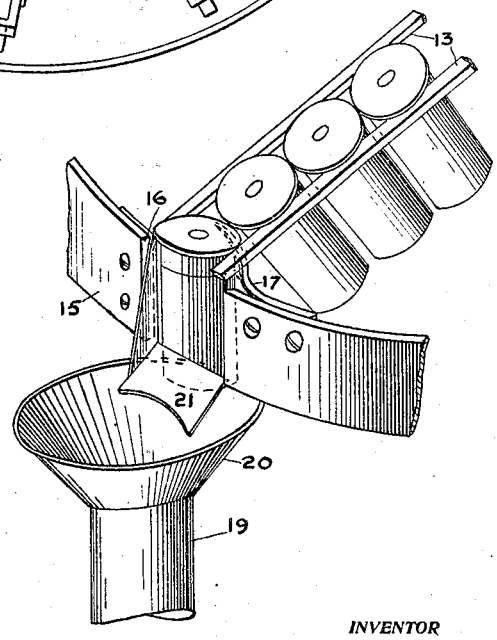

In the accompanying drawing, Figure 1 is a side view, partly in section, of my improved shell feeding machine; Fig. 2 is a plan view; Fig. 3 is a detail perspective view of a chute and tipping device adjacent thereto.

Referring to the drawing, 1 indicates a stationary hopper supported by standards 2 on a table 3, said table being supported by posts 4 upon a lower table 5. Beneath said table 5 is mounted in suitable bearings 6, a horizontal shaft 7 carrying on its end a beveled pinion 8 which meshes with a bevel gear 9 upon a vertical shaft 10, having suitable bearings in the tables 3, 5. Upon the upper end of said shaft 10 and in the bottom of the hopper is a feeder head 11, formed symmetrically with reference to the shaft 10, and having formed in its periphery a series of grooves 12 in vertical planes through the axis of the feeder head 11, said grooves being adapted to receive therein the shells. Depending from the lower portion of said feeder head and in register with said grooves are a series of pairs of bars 13 forming inclined and outwardly extending guideways for the shells, their lower ends being supported by a table 14 secured to the shaft. Said bars are parallel with each other and spaced apart a distance which is greater than the diameter of the body portion of the shells and less than the diameter of the rim portion thereof, so that the body portion can fall between the sides of the guideway, while the rim portion cannot, consequently the shell assumes a position in which the rim portion is above the guideway, while the body portion is below it. The lower ends of the guideways are surrounded by a ring 15, having an opening 16 therein. Secured to said ring adjacent to said opening is a finger 17 which, in the rotation of said shaft and guideways carrying the shells, is adapted to engage the lowest shell which is then rotating in contact with said ring, and force the shell through said opening. Arranged adjacent to said opening is a chute 19 having a flaring upper end 20. As the shell is moved through the opening in the guideway, its lower end engages an obstacle 21 supported on the ring causing it to tip over, so that the closed end of the shell descends foremost into the chute. From said chute it is conducted by a suitable device to a filling machine. Should the filling machine be stopped while the feeding device is still in operation, the surplus shells which are fed to the chute are received within a box 24 and are carried up by an elevator 25 and recharged into the hopper.

It sometimes happens with machines now in use that a shell has a nail in its interior when it is fed into the filling machine. When the shell is filled with powder this generally leads to an explosion. It will be seen that with my invention this can not happen, because the shells can only be fed out of the hopper with their open ends downward, so that a nail which has entered said shell drops therefrom.

I claim:—

1. The combination of a hopper, a feeder head therein formed with grooves, a series of guideways registering with said grooves, means for rotating said feeder head and guideways, a finger arranged adjacent to the circular path of the ends of the guideways and adapted to engage the lowermost shell therein, and a chute arranged adjacent to said finger, substantially as described.

2. The combination of a hopper, a feeder head therein formed with grooves, a series of guideways registering with said grooves, means for rotating said feeder head and guideways, a finger arranged adjacent to the circular path of the ends of the guideways and adapted to engage the lowermost shell therein, and a chute arranged adjacent to said finger and a tipping device arranged to engage the lower end of the shell and tip the same as it descends into said chute, substantially as described.

3. The combination of a hopper, a feeder head therein formed with grooves, a series of guideways registering with said grooves, means for rotating said feeder head and guideways, a table having an annular rim with an opening adjacent to said finger, substantially as described.

4. The combination of a hopper, a feeder head therein rotatable about a vertical axis and having in its surface grooves, the centers of which are in vertical planes through said axis, a series of guideways registering with said grooves and arranged in said planes, said guideways being formed with two parallel rods spaced apart a distance not less than the diameter of the body of the shells and not greater than the diameter of the rim portions, a chute past which the lower ends of said guideways travel, and means for transferring the shells from said guideways into said chute, substantially as described.

5. The combination of a hopper, a feeder head therein rotatable about a vertical axis having in its surface grooves, a series of guideways registering with said grooves and arranged in said planes, said guideways being formed with two parallel rods spaced apart a distance not more than the diameter of the rim portions and more than the diameter of the body portions, a chute past which the lower ends of said guideways travel, and means for transferring the shells from said guideways into said chute, substantially as described.

In testimony whereof I have hereunto set my hand in the presence of two subscribing witnesses.

RAYMOND H. STANDISH.

Witnesses:
FRANCIS M. WRIGHT,
D. B. RICHARDS.